(12) United States Patent
Attorre et al.

(10) Patent No.: US 10,769,496 B2
(45) Date of Patent: Sep. 8, 2020

(54) LOGO DETECTION

(71) Applicant: Adobe Systems Incorporated, San Jose, CA (US)

(72) Inventors: Brunno Fidel Maciel Attorre, New York, NY (US); Nicolas Huynh Thien, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 77 days.

(21) Appl. No.: 16/171,129

(22) Filed: Oct. 25, 2018

(65) Prior Publication Data

US 2020/0134377 A1 Apr. 30, 2020

(51) Int. Cl.
*G06K 9/62* (2006.01)

(52) U.S. Cl.
CPC ......... *G06K 9/6257* (2013.01); *G06K 9/6202* (2013.01)

(58) Field of Classification Search
CPC .......................... G06K 9/6257; G06K 9/6202
USPC ............................................ 382/156, 190, 154
See application file for complete search history.

(56) References Cited

U.S. PATENT DOCUMENTS

| | | | | |
|---|---|---|---|---|
| 9,892,324 | B1 * | 2/2018 | Pachauri | G06K 9/00751 |
| 10,198,671 | B1 * | 2/2019 | Yang | G06T 11/60 |
| 10,467,526 | B1 * | 11/2019 | Appalaraju | G06K 9/6215 |
| 10,496,884 | B1 * | 12/2019 | Nguyen | G06K 9/00671 |
| 2016/0350886 | A1 * | 12/2016 | Jessen | G06Q 50/184 |
| 2018/0330198 | A1 * | 11/2018 | Harary | G06K 9/6296 |
| 2019/0096135 | A1 * | 3/2019 | Dal Mutto | G06T 7/50 |
| 2019/0108396 | A1 * | 4/2019 | Dal Mutto | G06T 7/174 |
| 2019/0139212 | A1 * | 5/2019 | Hanzawa | G06T 7/11 |
| 2019/0147103 | A1 * | 5/2019 | Bhowan | G06F 16/2468 707/737 |
| 2019/0188729 | A1 * | 6/2019 | Mao | G06K 9/6267 |
| 2020/0090007 | A1 * | 3/2020 | Joseph | G06K 9/6267 |
| 2020/0104579 | A1 * | 4/2020 | Agarwal | G06K 9/00302 |
| 2020/0104851 | A1 * | 4/2020 | Agarwal | G06N 20/00 |

OTHER PUBLICATIONS

Bianco, Simone, et al., "Deep Learning for Logo Recognition", Computer Vision and Pattern Recognition, arXiv:1701.02620v2, May 3, 2017, 10 pages.

Romberg, Stefan, et al., "Scalable Logo Recognition in Real-World Images", Proceedings of ACM International Conference on Multimedia, 2011, 8 pages.

Uri Video, "Uru's Immersions", https://web.archive.org/web/20180312035100/https://vimeo.com/163895262, Apr. 2018, 16 pages.

* cited by examiner

*Primary Examiner* — Marceau Milord
(74) *Attorney, Agent, or Firm* — Kilpatrick Townsend & Stockton LLP (57) ABSTRACT

Disclosed herein are techniques for detecting logos in images or video. In one embodiment, a first logo detection model detects, from an image, candidate regions for determining logos in the image. A feature vector is then extracted from each candidate region and is compared with reference feature vectors stored in a database. The logo corresponding to the best matching reference feature vector is determined to be the logo in the candidate region if the best matching meets a certain criterion. In some embodiments, a second logo detection model trained using synthetic training images is used in combination with the first logo detection model to detect logos in a same image.

17 Claims, 8 Drawing Sheets

LOGO DETECTION

TECHNICAL FIELD

This application relates generally to machine learning-based logo detection from video or image data.

BACKGROUND

Enormous amount of video and image data is generated and shared every day, thanks to the ubiquity of digital cameras and Internet applications such as social networks. Video and image data constitutes a large portion of Internet content. For example, more than two-third of total Internet traffic is video data. With the overwhelmingly large amount of video and image data available, a need to automatically understand such massive amounts of data, such as detecting logos of brands appeared in the videos or images, has arisen.

Logo detection or recognition in images and videos can be used in many applications, such as copyright or trademark infringement detection, contextual advertise placement, intelligent traffic control based on vehicle logos, automated computation of brand-related statistics, augmented reality, and the like.

SUMMARY

Embodiments of the present disclosure are directed to, among other things, techniques for identifying logos in videos and images. According to certain embodiments, a logo detection technique is disclosed. The logo detection technique can be used to detect one or more target logos in an image. Various inventive embodiments are described herein, including methods, systems, non-transitory computer-readable storage media storing programs, code, or instructions executable by one or more processors, and the like.

In one embodiment, a method includes receiving a source image at one or more computing devices, and detecting, in the source image and using a first logo detection model implemented by the one or more computing devices, a candidate region for determining a logo in the source image. The method also includes extracting, from the candidate region and by a neural network implemented using the one or more computing devices, a feature vector of the candidate region, and determining, for each reference feature vector from a set of reference feature vectors stored in a database, a respective matching score between the reference feature vector and the feature vector of the candidate region, where each reference feature vector in the set of reference feature vectors is extracted from a respective image of a target logo in a set of target logos. The method further includes selecting a first reference feature vector associated with a highest matching score among the set of reference feature vectors, where the first reference feature vector is extracted from a first image of a first target logo in the set of target logos, and determining that the candidate region includes an image of the first target logo based on determining that the highest matching score is greater than a threshold value.

According to certain embodiments, a system includes a processing device and a non-transitory computer-readable medium communicatively coupled to the processing device, where the processing device is configured to execute program code stored in the non-transitory computer-readable medium and thereby perform operations including receiving a source image at one or more computing devices, and detecting, in the source image and using a first logo detection model implemented by the one or more computing devices, a candidate region for determining a logo in the source image. The operations also include extracting, from the candidate region and by a neural network implemented using the one or more computing devices, a feature vector of the candidate region, and determining, for each reference feature vector from a set of reference feature vectors stored in a database, a respective matching score between the reference feature vector and the feature vector of the candidate region, where each reference feature vector in the set of reference feature vectors is extracted from a respective image of a target logo in a set of target logos. The operations further include selecting a first reference feature vector associated with a highest matching score among the set of reference feature vectors, where the first reference feature vector is extracted from a first image of a first target logo in the set of target logos, and determining that the candidate region includes an image of the first target logo based on determining that the highest matching score is greater than a threshold value.

According to certain embodiments, a system includes means for receiving a source image, and means for detecting, in the source image and using a first logo detection model, a candidate region for determining a logo in the source image. The system also includes means for extracting, from the candidate region and using a neural network, a feature vector of the candidate region, and means for determining, for each reference feature vector from a set of reference feature vectors stored in a database, a respective matching score between the reference feature vector and the feature vector of the candidate region, where each reference feature vector in the set of reference feature vectors is extracted from a respective image of a target logo in a set of target logos. The system further includes means for selecting a first reference feature vector associated with a highest matching score among the set of reference feature vectors, the first reference feature vector extracted from a first image of a first target logo in the set of target logos, and means for determining that the candidate region includes an image of the first target logo based on determining that the highest matching score is greater than a threshold value.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Techniques disclosed herein relate generally to object detection, and more specifically, to detect and recognize specific logos in an image or a video using machine learning techniques. Logo detection or recognition from images and videos can be used in many applications, such as copyright or trademark infringement detection, contextual advertise placement, intelligent traffic control based on vehicle logos, automated computation of brand-related statistics, augmented reality, and the like.

According to certain embodiments, a logo detection technique is disclosed. The logo detection technique can be used to detect one or more target logos in an image. In one embodiment, an agnostic logo detection model (e.g., a Fast region-based convolutional neural network (R-CNN)) is used to detect one or more candidate regions in a source image, where each candidate region is likely to include an image (or an instance) of a known or unknown logo. A feature vector is extracted from each candidate region using, for example, a feature extraction portion of a convolutional neural network. The feature vector extracted from each candidate region is compared with reference feature vectors stored in a database to find a best matching reference feature vector. Reference feature vectors stored in the database are extracted from images of known target logos to be detected from videos or images, for example, using at least a feature extraction portion of a convolutional neural network. The target logo associated with the best matching reference feature vector is determined as present in the candidate region in the source image if the best matching score is greater than a threshold value.

In addition, in some embodiments, the agnostic logo detection model for identifying candidate regions and/or a logo detection model for directly detecting target logos present in images or videos are trained using real-world images and synthetic training samples to improve the performance of the logo detection models for detecting known logos. In some embodiments, the synthetic training samples are generated by identifying regions in a background image that are suitable for superimposing an image of a logo, and superimposing an image (e.g., a transformed version of an image) of a logo in an identified region in the background image. In some embodiments, the regions suitable for logo superposition are determined by classifying each pixel in the background image as suitable or unsuitable for logo superposition, and grouping neighboring pixels that are classified as suitable for logo superposition to form the regions of the background image for logo superposition. In some embodiments, the pixels in the background image are classified based on the materials that the pixels correspond to.

Furthermore, in some embodiments, the agnostic logo detection model for identifying candidate regions and the logo detection model for directly detecting target logos present in images or videos are used in combination to detect one or more logos in an image or a video. For example, the two models can be used in parallel to analyze a same source image or can be used sequentially to detect logos in a same source image, and the results of the two models can be combined to determine logos in the source image.

Techniques disclosed herein can be used to more efficiently and more accurately detect one or more logos in an image or a video. For example, compared with techniques that use logo detection models trained using limited real-world training images (which may be labeled with only one logo even if more than one logo is present in a training image), such as the Flickr-27, Flickr-32, and Flickr-47 datasets, techniques disclosed herein can synthesize training images based on background images and (transformed or distorted) images of logos, and train more accurate logo detection models using the synthesized training images.

In addition, in some embodiments, a new target logo can be added to the set of target logos to be detected from videos or images without retraining any of the models or networks. For example, to add a new target logo to the set of target logos, images of the new target logo are obtained. Feature vectors are extracted from the images of the new target logo and saved in the database as reference feature vectors. To detect logos in a new source image that likely includes an image of the new target logo, candidate regions that likely embody a logo are determined by the agnostic logo detection model, a feature vector is extracted from each candidate region and compared with each reference feature vector in the database (including the reference feature vectors extracted from the images of the new target logo) to find a match. As such, new target logos can be detected by existing models or networks without retraining such models or networks using images of the new target logos.

Furthermore, the combination of the agnostic logo detection model for identifying candidate regions and the logo detection model for directly detecting target logos present in images or videos helps to detect more than one logo in an image more accurately and more quickly, and maximize the probability of identifying brand logos inside an image or inside a frame of a video. For example, the detection results using the two models can be collaborated to determine the logos in the image, and thus can reduce errors.

The following examples are provided to introduce certain embodiments. In the following description, for the purposes of explanation, specific details are set forth in order to provide a thorough understanding of examples of the disclosure. However, it will be apparent that various examples can be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Figure 1:
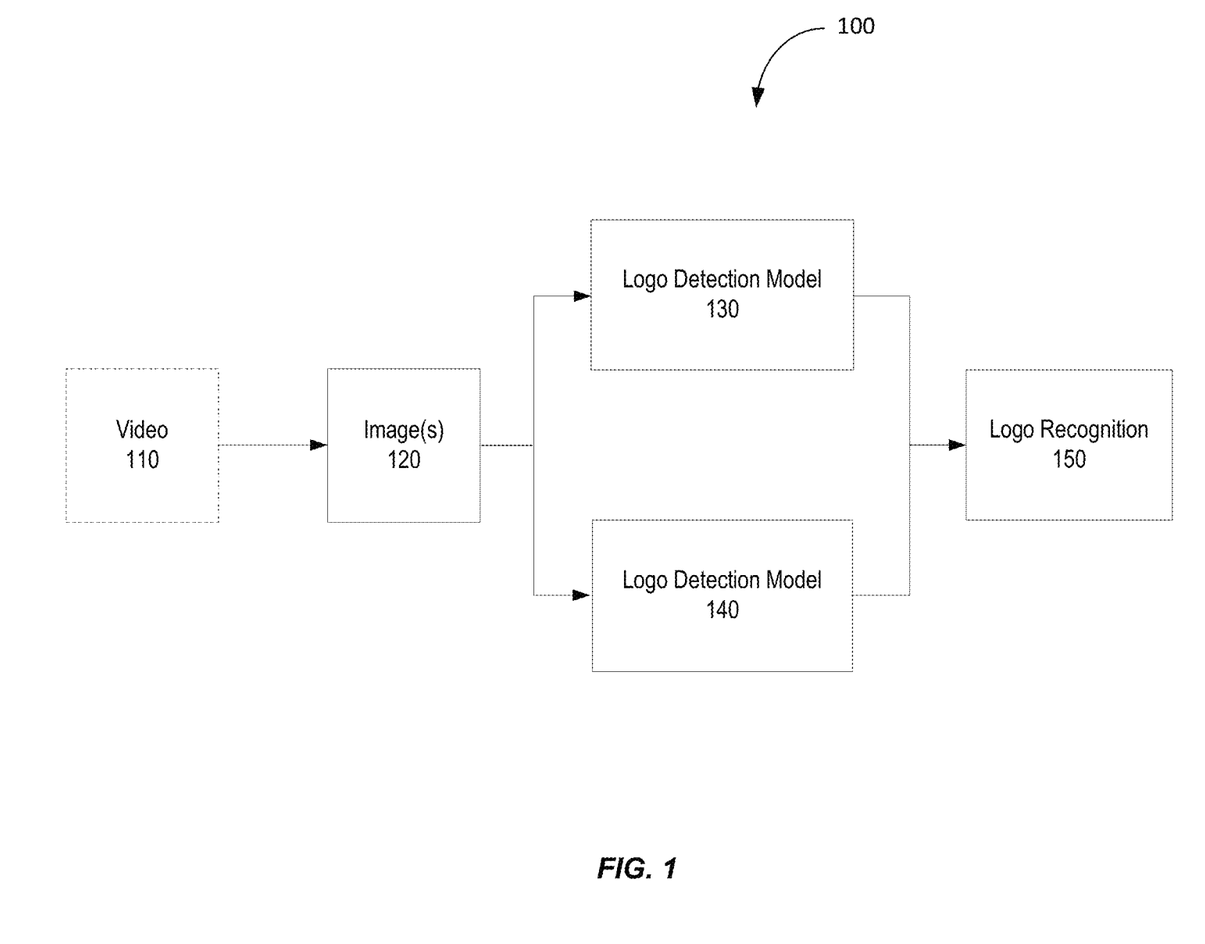
FIG. 1 illustrates an example of a logo detection system including two logo detection models according to certain embodiments.

FIG. 1 illustrates an example of a logo detection system 100 including two logo detection models according to certain embodiments. In logo detection system 100, two successive or parallel logo detection models 130 and 140 are used to maximize the probability of identifying brand logos inside an image or inside a frame of a video. For example, a video 110 is submitted through, for example, an application programming interface (API). A certain number of images 120 can be captured from video 110 in each second and passed through two logo detection models 130 and 140. Logo detection models 130 and 140 predict the presence of one or more brand logos and their respective coordinates in each of images 120. Logo detection model 130 is trained using a training dataset that includes certain types of logos, and thus is able to detect these types of logos if they are present in images 120. Logo detection model 140 is trained to identify regions in images 120 that are likely to include a logo, but the logo may or may not be one of the logos that logo detection model 130 has been specifically trained to detect. Logo detection model 140 then tries to predict the logo in the identified regions in images 120.

Logo detection model 130 and logo detection model 140 can process images 120 sequentially or in parallel. For example, in some embodiments, images 120 are processed by logo detection model 130 first. If no known logo is detected by logo detection model 130, the images are sent to logo detection model 140, which may try to identify potential logos in the images. In some embodiments, each image 120 is sent to both logo detection models in parallel or sequentially, where logo detection model 130 detects some known logos from the images and logo detection model 140 detects other logos that may also be in the images. Thus, even if an image includes two or more known or unknown logos, logo detection system 100 is able to detect these logos. The results from logo detection model 130 and logo detection model 140 can be combined to generate a logo recognition result 150. For example, the results of logo detection model 130 and logo detection model 140 can be collaborated or can augment each other.

Figure 2:
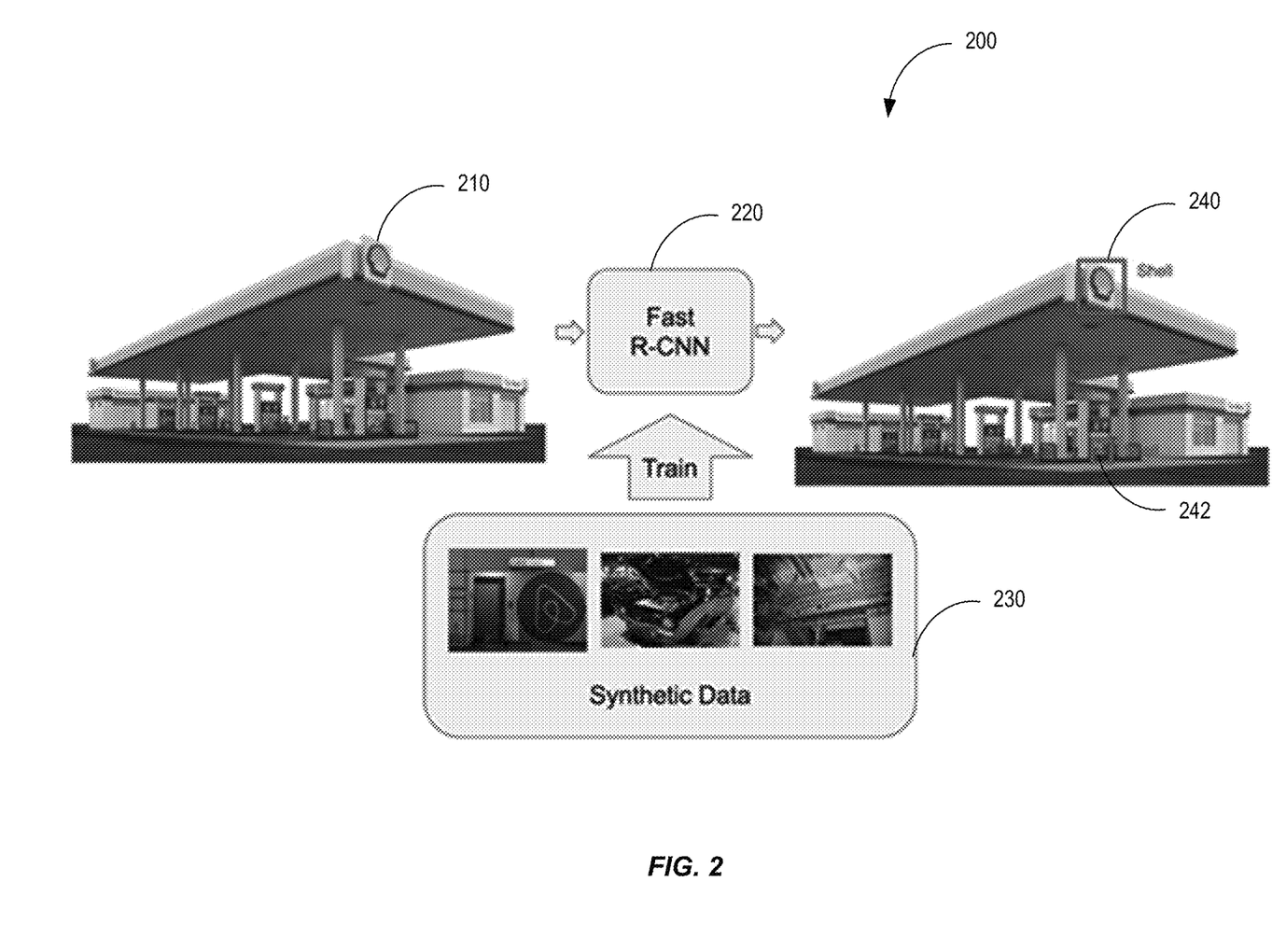
FIG. 2 illustrates an example of a logo detection model according to certain embodiments.

FIG. 2 is a simplified flow diagram 200 showing an example of a process for logo detection using a logo detection model 220 trained to detect known logos according to certain embodiments. Logo detection model 220 may be an example of logo detection model 130 and may be trained using available annotated training samples and/or synthesized training samples 230. Logo detection model 220 may include, for example, a region-based convolutional neural network (R-CNN), a fast R-CNN network, or a faster R-CNN network. In some embodiments, logo detection model 220 may divide an image, such as input image 210, into a plurality of regions (e.g., about 2000 regions), then use greedy algorithm to recursively combine similar regions into larger regions, and use the generated regions to produce candidate regions. A CNN in logo detection model 220 may then extract feature vectors from each candidate region and classify the candidate region based on the feature vectors. In some embodiments, instead of feeding the candidate regions to the CNN, the input image may be fed to the CNN to generate a convolutional feature map, and candidate regions may be identified from the convolutional feature map using selective search techniques and may be reshaped to a predetermined size using, for example, a region-of-interest (ROI) pooling layer. The reshaped candidate region may then be classified using a fully connected layer. In some embodiments, instead of using the selective search techniques to identify the candidate regions, another network may be used to predict the candidate regions. The predicted candidate regions may then be reshaped using a ROI pooling layer, and the reshaped candidate regions may be used to classify the image within the candidate regions and predict the offset values for the bounding boxes of the candidate regions. Logo detection model 220 may detect two logos 240 and 242 (e.g., "Shell") from image 210, where logo detection model 220 may have been trained using images that include the "Shell" logos and annotation indicating the "Shell" logos in the images.

Due to the limited availability of annotated training samples, the logo detection model trained using the limited training samples may not be sufficient to accurately and completely detect logos present in an image. According to certain embodiments, training images may be synthesized using images of logos and background images. In some embodiments, a surface of an image that is suitable for logo superposition may be detected and used to superimpose an image of a logo.

Figure 3:
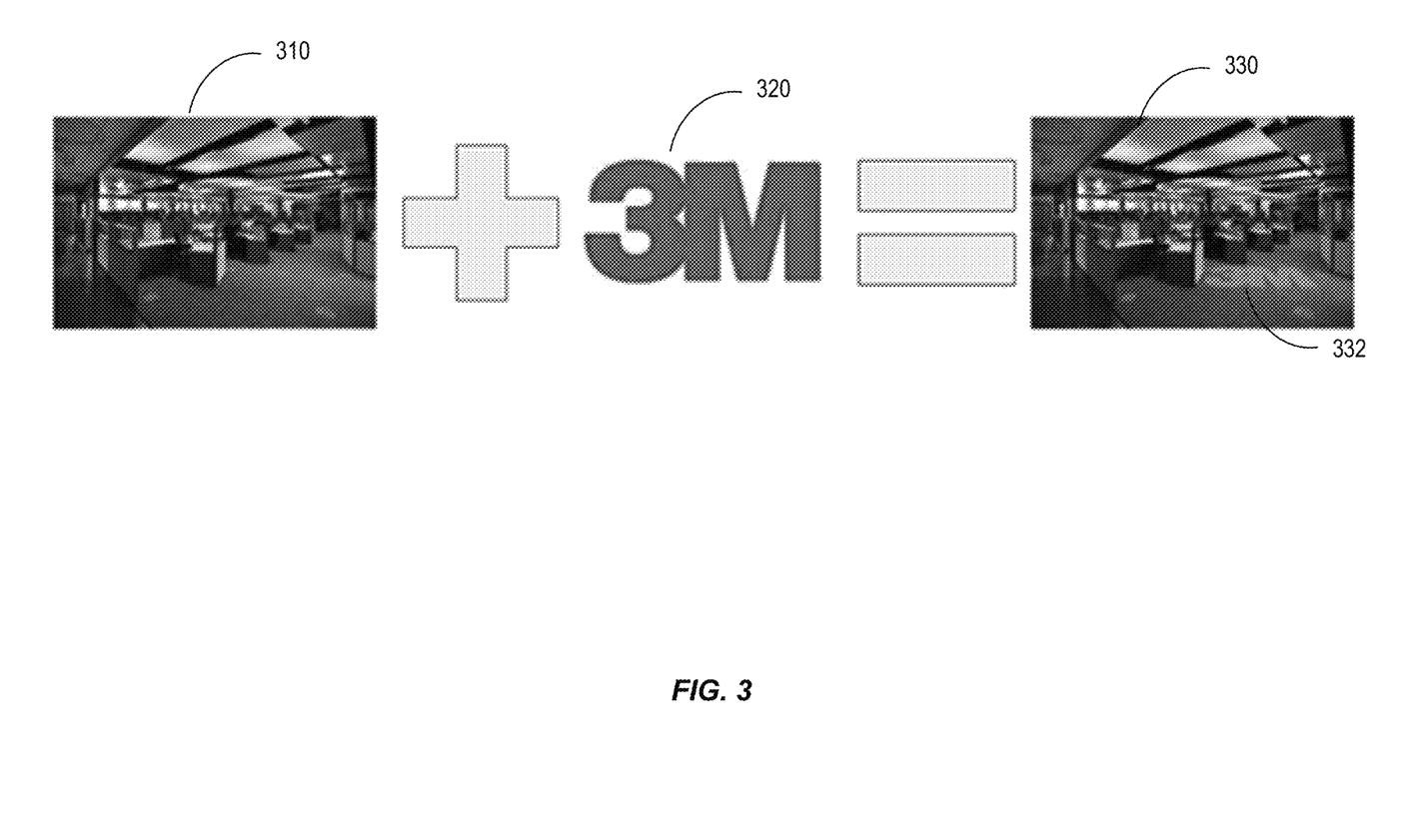
FIG. 3 illustrates an example of synthetic training data generation according to certain embodiments.

FIG. 3 illustrates an example of synthetic training data generation according to certain embodiments. FIG. 3 shows a background image 310, an image of a logo 320 (e.g., "3M"), and a synthesized image 330 that includes background image 310 and a logo 332 that may be a transformed version of logo 320. Logo 332 may be superimposed on a surface (e.g., the floor) within background image 310. Synthesized image 330 may be used for training a logo detection model to detect, for example, logo 320 (e.g., "3M" in the example shown in FIG. 3).

As shown in FIG. 3, the background image can be any image that may include images of one or more surfaces. In some embodiments, one or more surfaces may be identified from a background image (e.g., a frame image in a video). For example, the background image may be passed to a neural network that can classify each area of the image according to the material of the area. Surfaces of some materials, such as hair, skin, food, foliage, fabric, leather, glass, water, or mirror, may be classified as unsuitable for logo superposition. Surfaces of some materials, such as brick, carpet, metal, paper, plastic, polished stone, stone, tile, wallpaper, wood, painted, sky, and the like, may be classified as suitable for logo superposition. In some embodiments, each pixel of the image may be classified as either suitable for logo superposition or unsuitable for logo superposition based on a threshold value. For example, pixels that are classified as faces using a facial detection classifier may be classified as unsuitable for logo superposition. One or more regions in which every pixel inside each respective region is classified as suitable for logo superposition may be determined. The regions may have a shape of a triangle, a rectangle, a circle, an oval, or other shapes. A list of the one or more regions may be returned as detected surfaces suitable for logo superposition.

The image of the logo may be linearly or nonlinearly transformed in various ways, such as being tilted, rotated, flipped, scaled, distorted, faded, blurred, sharpened, and the like. The transformed image of the logo may be superimposed on a determined region of the background image to form a synthesized training image that can be used to train the logo detection model. In some embodiments, blurring (e.g., Gaussian blurring) or blending (e.g., Poisson blending) may be performed in the region where the transformed image of the logo is placed.

Figure 4:
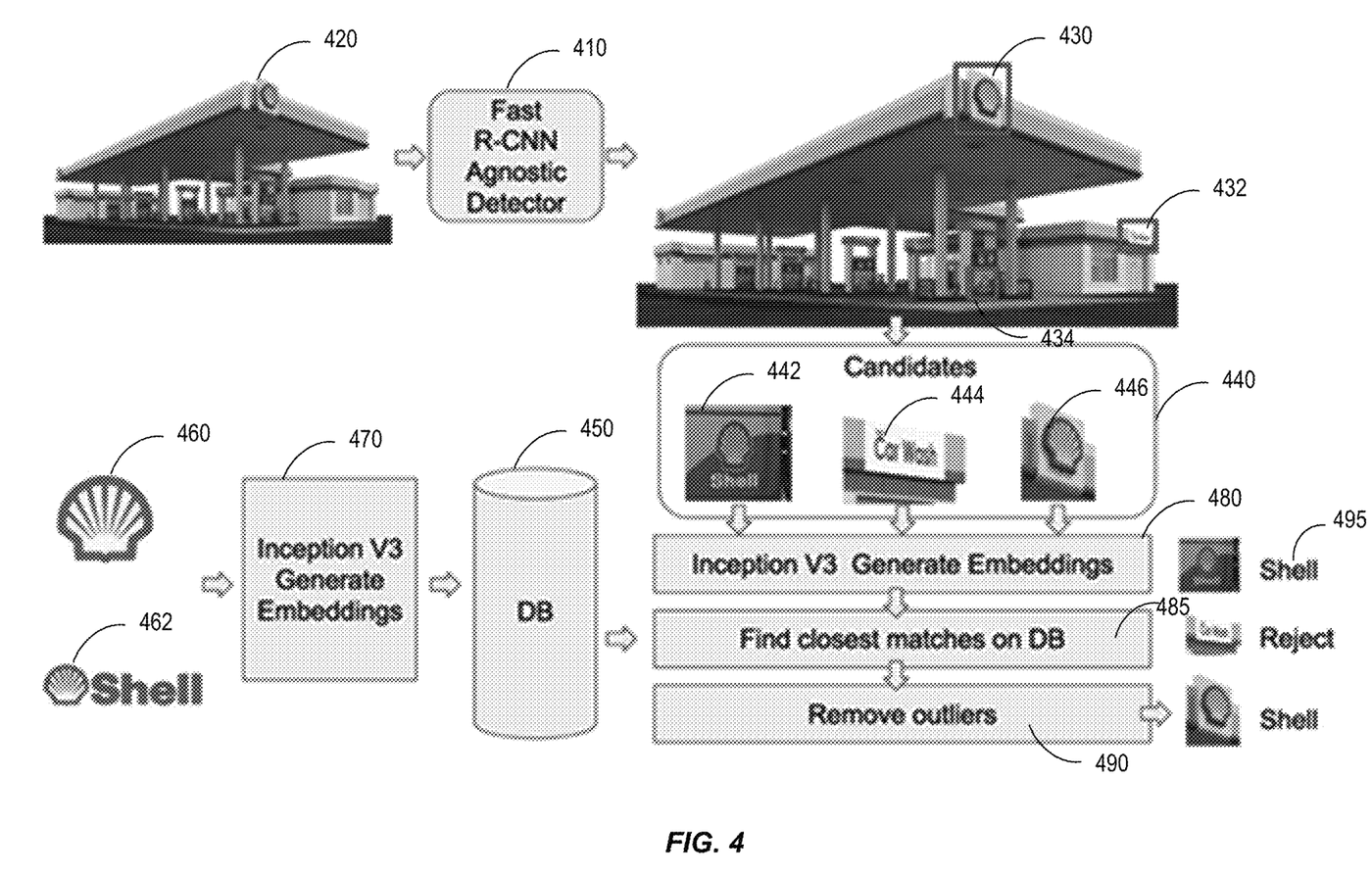
FIG. 4 illustrates an example of logo detection using an agnostic logo detection model according to certain embodiments.

FIG. 4 illustrates an example of logo detection using a logo detection model 410 according to certain embodiments. As logo detection model 220, logo detection model 410 may include, for example, a CNN, R-CNN, fast R-CNN, faster R-CNN, and the like. Logo detection model 410 may be used to detect objects that may be logos but may or may not be the logos that the logo detection model has been specifically trained to detect. In some embodiments, logo detection model 410 may detect generic logo patches or regions (i.e., regions that are likely to embody a logo). For example, in the example shown in FIG. 4, logo detection model 410 may receive an image 420, which may include images of one or more logos, and identify candidate regions 430, 432, and 434 that likely embody a logo from image 420. Outputs 440 of logo detection model 410 may thus include sub-images 442, 444, and 446 that may be cropped out from image 420 or may include identifications (e.g., coordinates) of candidate regions 430, 432, and 434.

A database 450 may store images of logos and/or features extracted from images of logos. Features extracted from the images of logos may be represented by embeddings, which map discrete objects, such as images, to vectors of real numbers (referred to as feature vectors). For example, available images 460 and 462 of known logos may be passed to a feature extractor (e.g., an embedding generator 470), which may extract features from the images of logos and save the features and/or the images in database 450. In some embodiments, the feature extractor may include at least a feature extract portion of a convolutional neural network, such as the GoogLeNet, Visual Geometry Group (VGG) network, BN-Inception, Inception V3 network, and the like.

Each of sub-images 442, 444, and 446 extracted from image 420 may be passed to a feature extractor 480 to extract features from each of sub-images 442, 444, and 446 using a feature extractor as described above. The features extracted from each of sub-images 442, 444, and 446 may be compared with reference features stored in database 450 by a comparator 485 to determine if there is a match between any reference features stored in databased 450 and features extracted from sub-image 442, 444, or 446. Comparator 485 may compare features (e.g., represented by feature vectors) to determine matching scores between features. For example, comparator 485 may determine a matching score based on, for example, a distance (e.g., Euclidean distance, Manhattan distance, Chebyshev distance, Hamming distance, and the like) between two feature vectors, and find the best matching reference features based on the highest matching score. A logo associated with the best matching reference features in database 450 may be identified as the logo embedded in sub-image 442, 444, or 446. If a matching score between the best matching reference features in database 450 and features extracted from sub-image 442, 444, or 446 is less than a threshold value, sub-image 442, 444, or 446 may be identified as not including any of the logos in database 450, and may be removed as outliers at 490. The logo detection result for each candidate region may be presented at outputs 495, which may indicate the identified logo for the candidate region or indicate that no known logo is detected in the candidate region.

To evaluate the performance of the logo detection models, three different logo detection models are tested using logo datasets Flickr-27 and Flickr-47. Flickr-27 dataset is an annotated logo dataset downloaded from Flickr and includes three image sets. A training image set includes 810 annotated images for 27 logo classes (or brands) (30 images for each class). All training images are annotated with bounding boxes of the logo instances in the training image. There may be multiple logo instances in each training image. A distractor image set includes 4207 logo images that depict, in most cases, clean logos. Each image in the distractor image set defines its own logo class and the bounding box includes the whole image. A query image set includes about 270 images, which includes five images for each of the 27 annotated classes, and 135 Flickr images that do not depict any logo class. Flickr-47 dataset includes real-world images collected from Flickr that depict 47 logo classes in various circumstances and is annotated specifically for the task of logo detection and recognition.

Model 1 used in the test is a Fast R-CNN model trained to detect 54 classes of logos from Flickr-27 and Flickr-47 datasets. Model 2 is a Fast R-CNN model, such as logo detection model 220 described above with respect to FIG. 2. Model 2 may be trained using Flickr-27 and Flickr-47 training samples and synthesized training samples as described above with respect to FIG. 3. In the example, Model 2 is trained to detect about 800 classes of logos. Model 3 uses a fast R-CNN model to detect regions likely embodying logos and uses a logo database that includes embeddings of known logos, as described above with respect to FIG. 4. Model 2 and Model 3 may be trained with 20 times more training samples than Model 1, where the additional training samples may be synthesized as described above with respect to FIG. 3.

F-scores are determined based on the logo detection results to indicate the quality score of the classification of logos in the test samples or the performance of the logo detection models. The F-score (also referred to as F1 score or F-measure) may be determined based upon both the precision p and the recall r of the classification. For example, the F-score may be a weighted average of the precision p and the recall r of the classification. In one example, the F-score may be the harmonic average of the precision and recall, and may range between 0 (worst precision and recall) and 1 (perfect precision and recall). The precision p and the recall r of the classification may be determined based on true positives (TP), true negatives (TN), false positives (FP), and false negatives (FN). True positives (TP) are samples that are correctly predicted as belonging to a logo class. True negatives (TN) are samples that are correctly predicted as not belonging to a logo class. False positives (FP) are samples that are incorrectly predicted as belonging to a logo class. False negatives (FN) are samples that are incorrectly predicted as not belonging to a logo class. Accuracy may indicate the ratio of correctly predicted samples to the total samples, and may be determined using Accuracy=(TP+TN)/(TP+FP+FN+TN). The precision may be determined by dividing the number of true positives using the sum of the numbers of true positives and false positives, i.e., p=TP/(TP+FP). A low precision may indicate a large number of False Positives. The recall may be determined by dividing the number of true positives using the sum of the number of true positives and the number of false negatives (i.e., the number of actually positive samples), i.e., r=TP/(TP+FN). The recall may indicate a classifier's completeness. A low recall may indicate many false negatives. The F-Score is the weighted average of the precision and the recall, and thus takes both false positives and false negatives into consideration. For example, the F-score may be determined using F=2×((p×r)/(p+r)).

Table 1 shows the test results (F scores) of the three logo detection models described above on logo datasets Flickr-27 and Flickr-47. The test results show that, models trained using synthetic training samples can outperform models trained using training samples that only include real-world images.

TABLE 1

Maximum F1 scores of three different models

| Models™est Dataset | Flickr-27 | Flickr-47 |
|---|---|---|
| 1 Fast R-CNN (54 classes from Flickr-27 and Flickr-47) | 0.8127 | 0.8389 |
| 2 Fast R-CNN + Synth Data (800 classes) | 0.7054 | 0.8837 |
| 3 Agnostic Fast R-CNN + LogoDB (800 classes) | 0.7265 | 0.8697 |

As can be seen from Table 1, Model 1 shows an F1 score of 83.9% for logo detection on Flickr-47 dataset, which is the lowest among the three models. Model 2 can identify more logo classes than Model 1 (about 14 times more) and have an F1 score 5% better than Model 1 on Flickr-47 dataset, at least partially due to the use of additional synthesized training samples. Table 1 also shows that Model 2 and Model 3 perform significantly worse on the Flickr-27 dataset. This may be due to the nature of the annotations in the dataset.

Figure 5A:
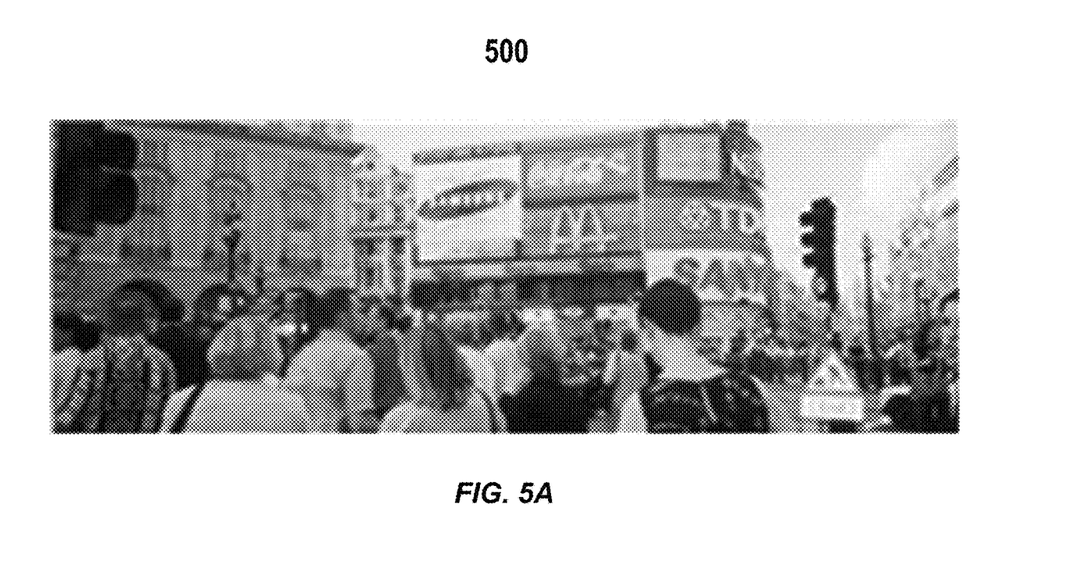
FIG. 5A illustrates an example of an image used to test the logo detection system according to certain embodiments.
Figure 5B:
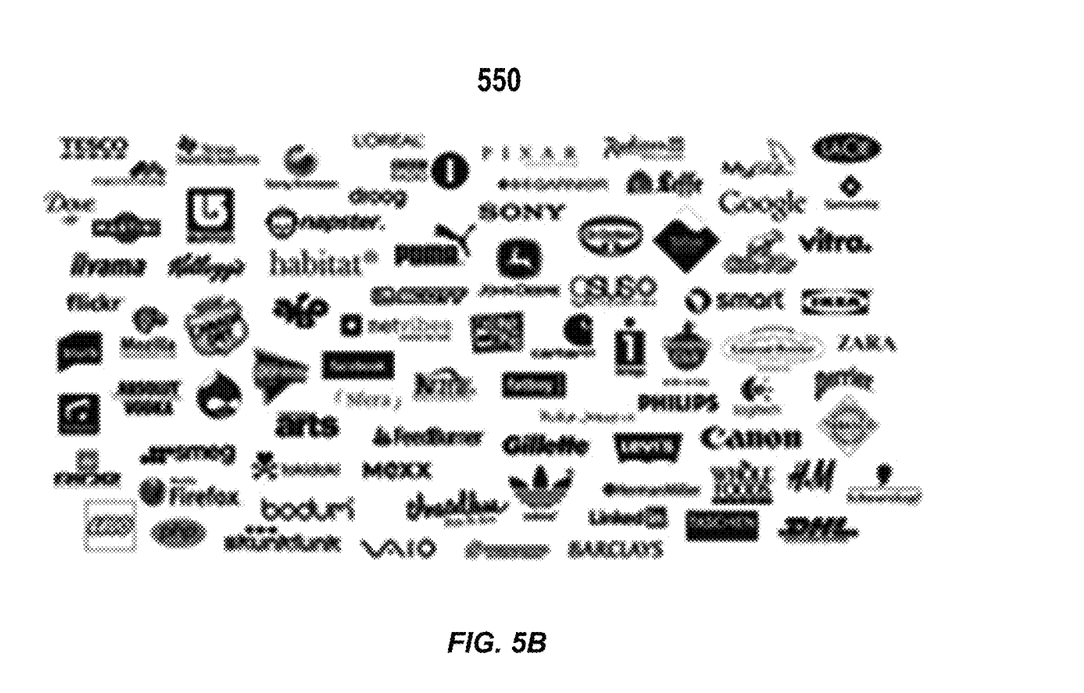
FIG. 5B illustrates another example of an image used to test the logo detection system according to certain embodiments.

FIG. 5A illustrates an example of an image 500 used to test the logo detection system according to certain embodiments. FIG. 5B illustrates another example of an image 550 used to test the logo detection system according to certain embodiments. Many images in the test dataset (e.g., Flickr-27 dataset), such as images 500 and 550 illustrated in FIGS. 5A and 5B, are annotated with just one logo class, even though there may be many other logos in a same image. For example, image 500 may only be annotated with "Coca-Cola," while image 550 may only be annotated with "DHL." From such images, Model 2 and Model 3 may detect many more logo classes than Model 1, while the images may only be annotated as including one logo. As such, the additional logos detected by Model 2 and Model 3 from these images may be mistakenly treated as false positives, and thus the F1 scores calculated for Model 2 and Model 3 may be lower than that of Model 1.

Model 2 offers a good solution for detecting brand logos that it has already been trained to detect. Thus, Model 2 may perform better than Model 3 on a closed set of logos. However, when a new logo class is added to the target logo classes to be detected using Model 2, new synthetic training data may need to be generated and Model 2 may need to be retrained using new training data. In some cases, generating the synthetic training data and retraining Model 2 may take a long time period, such as hours or days. Therefore, although more accurate, Model 2 may be less flexible for identifying new logo classes, which may not always be desirable for logo detection in production.

Model 3 may make it easier and faster to add new logo classes to the target logo classes to be identified. Thus, Model 3 may be used to dynamically and quickly adding new logos to the target logo classes to be identified based on customer demand. As described above, Model 3 may use a logo embedding database and an agnostic logo detection model that can identify regions that likely embody logos. The logo embedding database may be created by collecting images of logos of given brands to be identified, generating embeddings for each image of the logos or each logo (e.g., a feature vector with a length of 2048) using a neural network (e.g., a CNN such as the feature extract portion of a GoogLeNet, Visual Geometry Group (VGG) network, BN-Inception, Inception V3 network, and the like), storing the embeddings into the logo embedding database that may be able to perform fast vector operations. The logo embedding database may be updated offline when a new logo class is added to the target logo classes to be identified. The agnostic logo detection model may detect candidate regions in an input image that may include a logo. The embedding for each candidate region may be generated using a neural network, such as the neural network used to generate the logo embedding database. The embedding generated from each candidate region may be compared with the embeddings in the logo embedding database to determine if there is a match. In this way, when a new logo class is added to the target logo classes to be detected, no retraining of the agnostic logo detection model or the neural network for embedding generation may be needed.

Figure 6:
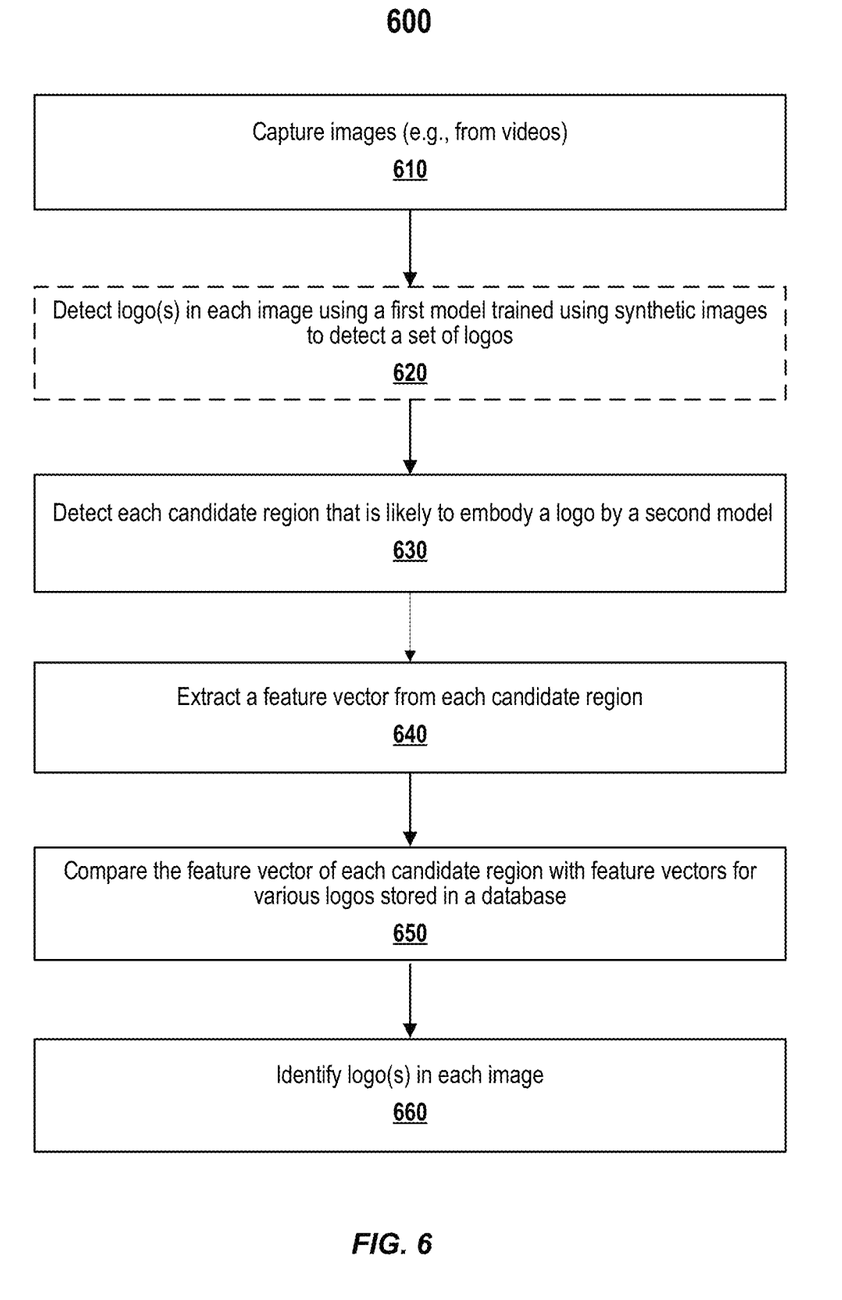
FIG. 6 illustrates an example of a method for logo detection according to certain embodiments.

FIG. 6 is a flow chart 600 illustrating an example of a method for logo detection according to certain embodiments. Operations in flow chart 600 can be performed by one or more processing devices, such as a computing system 800 described below with respect to FIG. 8. In some embodiments, operations in flow chart 600 can be performed by one or more servers in a cloud computing environment as described below with respect to FIG. 7. In some embodiments, the one or more processing devices may implement one or more neural networks for one or more machine learning-based models. Even though FIG. 6 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

At block 610, the one or more processing devices may obtain images, for example, from a video that may include hundreds of, thousands of, or more image frames. In some embodiments, one or more image frames may be captured in every second or every minute of the video. In some embodiments, the images may be obtained from various websites, social medium platforms, or other image sharing platforms. The images may or may not include a logo of interest (i.e., a target logo). In some embodiments, an image may include images of two or more target logos to be detected and identified.

Optionally, at block 620, the one or more processing devices may implement a first model trained to detect logos of interest (i.e., target logos) and use the logo detection model to detect logos in each image. For example, the first model may be a convolutional neural network, such as a Fast R-CNN or any other variation of a R-CNN network. The first model may be trained using, for example, Flickr-27, Flickr-32, and/or Flickr-47 datasets. In some embodiments, the first model may also be trained using synthesized images. For example, regions in a background image that are suitable for superimposing an image of a logo may be identified and used for superimposing the image of the logo. In some embodiments, the image of the logo may be transformed (e.g., tilted, rotated, flipped, scaled, distorted, faded, blurred, sharpened, and the like) before being superimposed on the background image. In some embodiments, the regions suitable for logo superposition may be determined by classifying each pixel in the background image as suitable or unsuitable for logo superposition, and grouping neighboring pixels that are classified as suitable for logo superposition to form the regions of the background image for logo superposition. In some embodiments, the pixels in the background image may be classified based on the materials that the pixels correspond to. For example, pixels corresponding to materials such as hair, skin, food, foliage, fabric, leather, glass, water, or mirror may be classified as unsuitable for logo superposition, while pixels corresponding to materials such as brick, carpet, metal, paper, plastic, polished stone, stone, tile, wallpaper, wood, painted, sky, and the like, may be classified as suitable for logo superposition.

At block 630, the one or more processing devices may implement a second model that is trained to detect each candidate region in an input image that is likely to embody a logo. The second model may be, for example, a convolutional neural network, such as a Fast R-CNN or any other variation of a R-CNN network. The second model may be trained using, for example, Flickr-27, Flickr-32, and/or Flickr-47 datasets. In some embodiments, the second model may also be trained using synthesized images as described above.

At block 640, the one or more processing devices may implement a feature extractor to extract a feature vector (i.e., embedding) from each candidate region. The feature extractor may include a convolutional neural network, such as the feature extract portion of a GoogLeNet, VGG, BN-Inception, Inception V3 network, and the like.

At block 650, the one or more processing devices may compare the feature vector of each candidate region with reference feature vectors stored in an embedding database. The reference feature vectors may be extracted from images of known logos using a feature extractor as described above and stored in the embedding database. In some embodiments, for each candidate region, a matching score between a respective reference feature vector in the embedding database and a feature vector extracted from the candidate region may be determined.

At block 660, the one or more processing devices may identify the logo(s) in each image. For example, one or more logos may be identified based on the results at blocks 620 and 650. In some embodiments, for each candidate region, a reference feature vector associated with a highest matching score among the reference feature vectors in the embedding database may be selected, where the reference feature vector may be extracted from an image of a first target logo in the set of target logos. The candidate region may be determined to include an image of the first target logo based on determining that the matching score between the reference feature vector extracted from the image of the first target logo and the feature vector extracted from the candidate region is greater than a threshold value. Otherwise, the candidate region may be determined as not including an image of a target logo.

In some embodiments, a new target logo may be added to the set of target logos to be detected from videos or images without retraining any of the models or networks. For example, to add a new target logo to the set of target logos, images (e.g., about 20 or more images) of the new target logo may be obtained. Feature vectors may be extracted from the images of the new target logo and saved in the embedding database as reference feature vectors. To detect logos in a new source image that may include an image of the new target logo, candidate regions in the new source image that may embody a logo may be determined by the second model, and a feature vector may be extracted from each candidate region and compared with each reference feature vector in the embedding database (including the reference feature vectors extracted from the images of the new target logo) to find a match. As such, new target logos may be detected by existing models or networks without retraining such models or networks.

Figure 7:
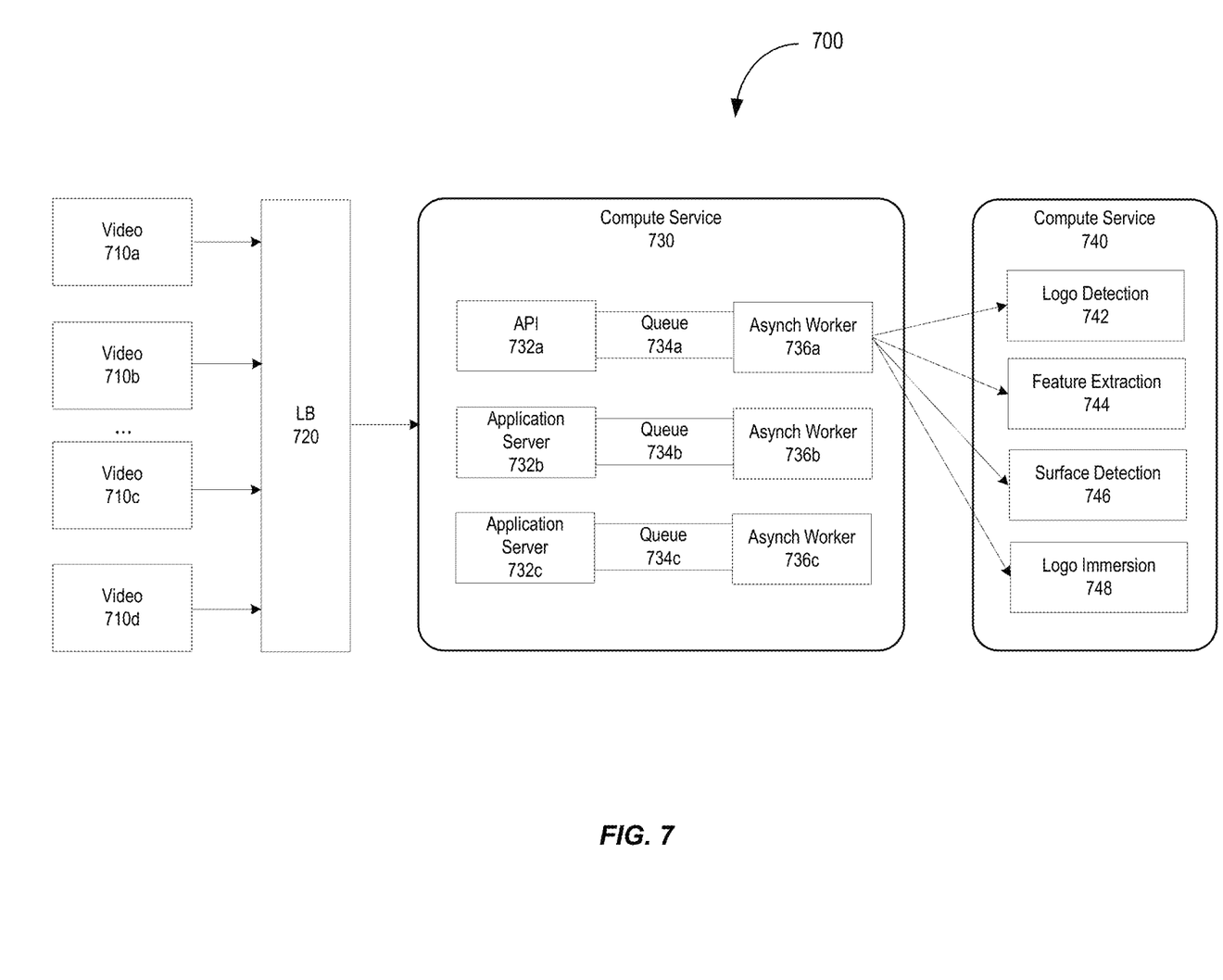
FIG. 7 illustrates an example of a system environment for implementing some of the embodiments disclosed herein.

FIG. 7 illustrates an example of a system environment 700 for implementing some of the embodiments disclosed herein. System environment 700 may be implemented in a cloud computing environment, such as Amazon Web Service (AWS). Videos 710*a*, 710*b*, 710*c*, 710*d*, and the like, or images may be submitted to a server through a website. The videos or images may be distributed to different application servers in a compute service 730 through a load balancer 720. One example of compute service 730 is Amazon Elastic Compute Cloud (EC2). Each application server in compute service 730 may be responsible for handling the API workflow, the authorization workflow, and the asynchronous orchestration of the image processing jobs. The application server may also capture frames of images from a video. Each application server in compute service 730 may include an application programming interface (API) (e.g., API 732*a*, 732*b*, or 732*c*), a queue (e.g., queue 734*a*, 734*b*, or 734*c*), and an asynchronous worker (e.g., async worker 736*a*, 736*b*, or 736*c*). The asynchronous worker may be configured to send image processing jobs in the queue to a compute service 740 that may include a pool of applications. One example of compute service 740 is AWS Lambda.

Each application (which may sometimes be referred to as a worker) in the pool of applications hosted by compute service 740 may be a program that implements certain processing steps. Each application may be built using different programming languages (e.g., python or Java), and may reuse existing applications to create new applications. The applications may be implemented using cloud services, enterprise applications, legacy systems, or scripts. The number of workers for processing each type of tasks may be independently controlled to control the throughput of the applications. The applications may be hosted by one or more servers. In some embodiments, the applications may implement one or more neural networks. Examples of applications hosted by compute service 740 may include, a logo detection application 742, a feature extraction application 744, a surface detection application 746, and a logo immersion application 748. Logo detection application 742 may be used to classify logo(s) in individual images as described above. Feature extraction application 744 may be used to extract features from an image to generate a feature vector or embedding for the image. Surface detection application 746 may be used to score each pixel in an image to determine whether the pixel is suitable for logo superposition. Logo immersion application 748 may be used to determine one or more surfaces or regions in an image for superimposing an image of a logo, transform an image of a logo, and generate a synthetic training image by superimposing the transformed image of the logo on a surface (or region) determined to be suitable for logo superposition.

In some embodiments, system environment 700 may also include one or more storage servers (e.g., AWS Simple Storage Service (S3)) that can be used to store video files, image frames, audio files, or embeddings (e.g., feature vectors) of images that include target logos.

Figure 8:
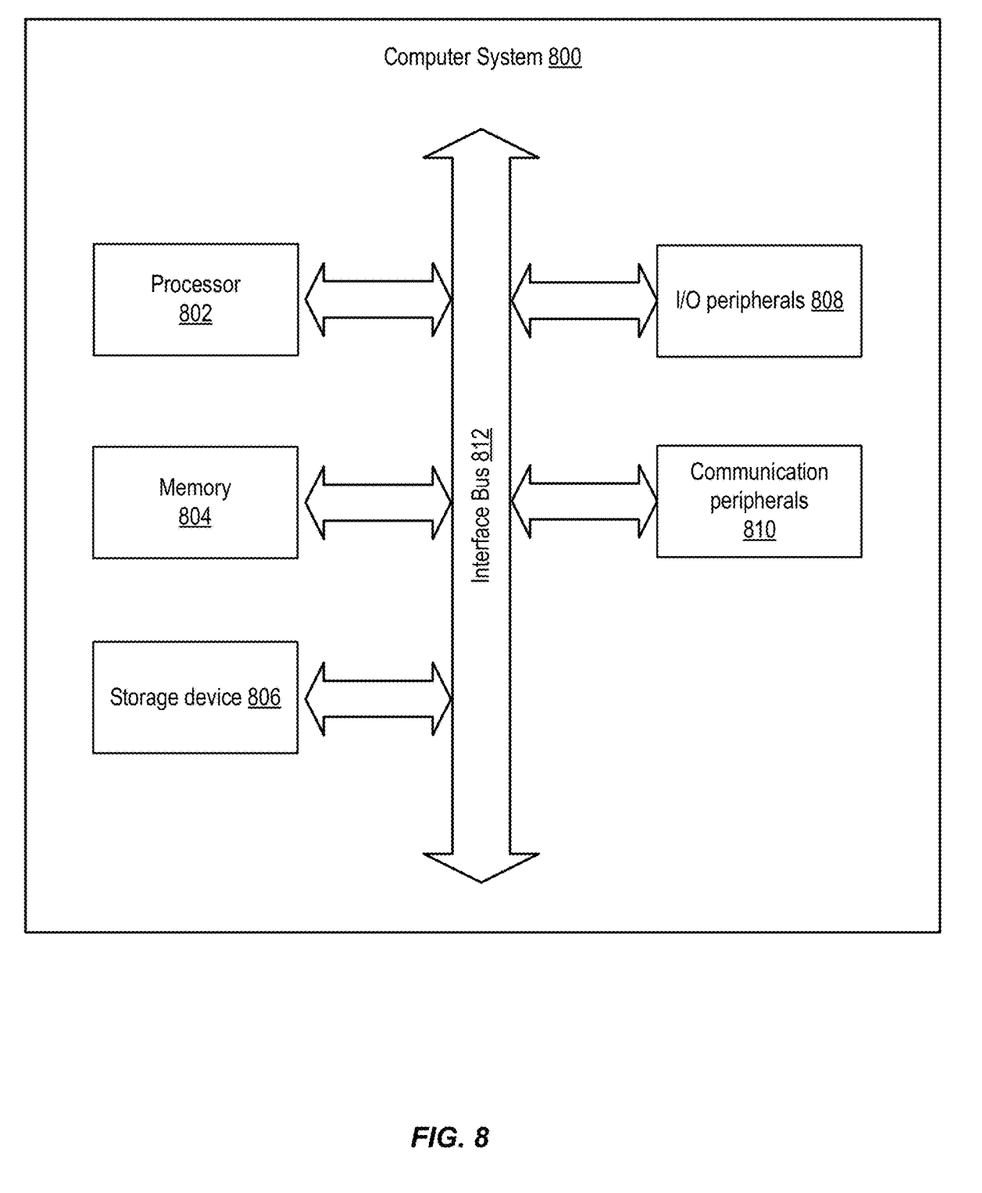
FIG. 8 illustrates an example computing system for implementing some of the embodiments disclosed herein.

Any suitable computing system or group of computing systems can be used for performing the operations described herein. For example, FIG. 8 depicts an example of computing system 800. Computing system 800 may be a computer, a server, a distributed computing system, or a cloud-based computing system.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 815, program data 816, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, an input device 820, a presentation device 818, or other input or output devices. For example, computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code 805 that configures the processor 802 to perform one or more of the operations described herein. The program code may be resident in the memory device 804 or any suitable computer-readable medium and may be executed by the processor 802 or any other suitable processor.

In some embodiments, one or more memory devices 804 store program data 807 that includes one or more datasets and models described herein. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an environment evaluation system 102) via a data network using the network interface device 810.

In some embodiments, the computing system 800 also includes the input device 820 and the presentation device 818 depicted in FIG. 8. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the environment evaluation system 102, other implementations are possible. For instance, in some embodiments, one or more of the input device 820 and the presentation device 818 can include a remote client-computing device that communicates with the computing system 800 via the network interface device 810 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

Terms "and," "or," and "an/or," as used herein, may include a variety of meanings that also is expected to depend at least in part upon the context in which such terms are used. The term "or" is used in its inclusive sense (and not in its exclusive sense) so that when used, for example, to connect a list of elements, the term "or" means one, some, or all of the elements in the list. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising: receiving a source image at one or more computing devices;
    detecting, in the source image and using a first logo detection model implemented by the one or more computing devices, a candidate region for determining a logo in the source image; extracting, from the candidate region and by a neural network implemented using the one or more computing devices, a feature vector of the candidate region; determining, for each reference feature vector from a set of reference feature vectors stored in a database, a respective matching score between the reference feature vector and the feature vector of the candidate region, wherein each reference feature vector in the set of reference feature vectors is extracted from a respective image of a respective target logo in a set of target logos; selecting a first reference feature vector associated with a highest matching score among the set of reference feature vectors, the first reference feature vector extracted from a first image of a first target logo in the set of target logos; determining that the candidate region includes an image of the first target logo based on determining that the highest matching score is greater than a threshold value; receiving an image of a new target logo to be added to the set of target logos; extracting, using the neural network implemented using the one or more computing devices, a new reference feature vector from the image of the new target logo; and storing the new reference feature vector in the database.

2. The method of claim 1, wherein the first logo detection model includes a fast region-based convolutional neural network (R-CNN).

3. The method of claim 1, wherein the neural network includes a convolutional neural network.

4. The method of claim 1, further comprising:
    detecting, from the source image and using a second logo detection model implemented by the one or more computing devices, a second target logo in the set of target logos,
    wherein the second logo detection model is trained using training images including the set of target logos to detect the set of target logos.

5. The method of claim 4, wherein the second logo detection model includes a Fast R-CNN.

6. The method of claim 4, wherein: the first logo detection model and the second logo detection model are trained using synthetic training images; a synthetic training image includes a background image and an image of a target logo in the set of target logos; and the image of the target logo is superimposed on the background image.

7. The method of claim 6, wherein the image of the target logo is transformed before being superimposed on the background image.

8. The method of claim 6, wherein the image of the target logo is superimposed in a region of the background image, the region of the background image determined to be suitable for logo superposition.

9. The method of claim 8, wherein determining that the region of the background image is suitable for logo superposition comprises:
    classifying each pixel in the background image as suitable or unsuitable for logo superposition; and
    grouping neighboring pixels that are classified as suitable for logo superposition to form the region of the background image for logo superposition.

10. The method of claim 1, wherein the one or more computing devices include one or more cloud computing servers.

11. The method of claim 1, wherein the source image includes images of two or more logos.

12. A system comprising:
    a processing device; and
    a non-transitory computer-readable medium communicatively coupled to the processing device, wherein the processing device is configured to execute program code stored in the non-transitory computer-readable medium and thereby perform operations comprising:

receiving a source image at the processing device;

detecting, in the source image and using a first logo detection model implemented by the processing devices, a candidate region for determining a logo in the source image;

extracting, from the candidate region and by a neural network implemented using the processing device, a feature vector of the candidate region;

determining, for each reference feature vector from a set of reference feature vectors stored in a database, a respective matching score between the reference feature vector and the feature vector of the candidate region, wherein each reference feature vector in the set of reference feature vectors is extracted from a respective image of a respective target logo in a set of target logos;

selecting a first reference feature vector associated with a highest matching score among the set of reference feature vectors, the first reference feature vector extracted from a first image of a first target logo in the set of target logos;

determining that the candidate region includes an image of the first target logo based on determining that the highest matching score is greater than a threshold value;

receiving an image of a new target logo to be added to the set of target logos;

extracting, using the neural network implemented using the processing device, a new reference feature vector from the image of the new target logo; and storing the new reference feature vector in the database.

13. The system of claim 12, wherein the operations further comprise:

detecting, from the source image and using a second logo detection model implemented by the processing device, a second target logo in the set of target logos, wherein the second logo detection model is trained using training images including the set of target logos to detect the set of target logos.

14. The system of claim 13, wherein: the first logo detection model and the second logo detection model are trained using synthetic training images; a synthetic training image includes a background image and an image of a target logo in the set of target logos; and the image of the target logo is superimposed on the background image.

15. The system of claim 14, wherein:

the image of the target logo is superimposed in a region of the background image; and the region of the background image is determined by:
classifying each pixel in the background image as suitable or unsuitable for logo superposition; and
grouping neighboring pixels that are classified as suitable for logo superposition to form the region of the background image for logo superposition.

16. A system comprising: means for receiving a source image; means for detecting, in the source image and using a first logo detection model, a candidate region for determining a logo in the source image; means for extracting, from the candidate region and using a neural network, a feature vector of the candidate region; means for determining, for each reference feature vector from a set of reference feature vectors stored in a database, a respective matching score between the reference feature vector and the feature vector of the candidate region, wherein each reference feature vector in the set of reference feature vectors is extracted from a respective image of a respective target logo in a set of target logos; means for selecting a first reference feature vector associated with a highest matching score among the set of reference feature vectors, the first reference feature vector extracted from a first image of a first target logo in the set of target logos; means for determining that the candidate region includes an image of the first target logo based on determining that the highest matching score is greater than a threshold value; means for receiving an image of a new target logo to be added to the set of target logos; means for extracting, using the neural network, a new reference feature vector from the image of the new target logo; and means for storing the new reference feature vector in the database.

17. The system of claim 16, further comprising:

means for detecting, from the source image and using a second logo detection model, a second target logo in the set of target logos, wherein the second logo detection model is trained using training images including the set of target logos to detect the set of target logos.

\* \* \* \* \*